United States Patent [19]
Penner et al.

[11] 3,711,117
[45] Jan. 16, 1973

[54] VEHICLE SECURITY SYSTEM

[76] Inventors: Bruce W. Penner, 28362 Campbell; Kenneth W. Platt, 30040 Schoenherr, both of Warren, Mich. 48093

[22] Filed: Aug. 16, 1971

[21] Appl. No.: 171,851

[52] U.S. Cl...................280/150 R, 70/226, 280/400
[51] Int. Cl..............................................B60r 27/00
[58] Field of Search......280/150 R; 181/114; 70/236, 70/225, 18, 15, 49, 30, 58

[56] References Cited

UNITED STATES PATENTS

| | | | |
|---|---|---|---|
| 1,098,982 | 6/1914 | Seeber | 70/226 |
| 1,416,393 | 5/1922 | Willett | 70/226 |
| 1,201,514 | 10/1916 | Sherman | 70/226 |

*Primary Examiner*—Leo Friaglia
*Assistant Examiner*—Robert R. Song
*Attorney*—Russell C. Wells

[57] ABSTRACT

A vehicle security system for preventing the unauthorized moving of a vehicle such as a trailer. At least one of the wheels of the trailer is prevented from being rotated by being secured to the frame of the trailer by means of a flexible member such as a chain. One end of the chain is locked through a special nut on one of the wheel lugs and is locked to an eye bolt affixed to the frame. The length of the chain is such so as to prevent the wheel from rotating.

3 Claims, 2 Drawing Figures

PATENTED JAN 16 1973　　　　　　　　　　　　3,711,117
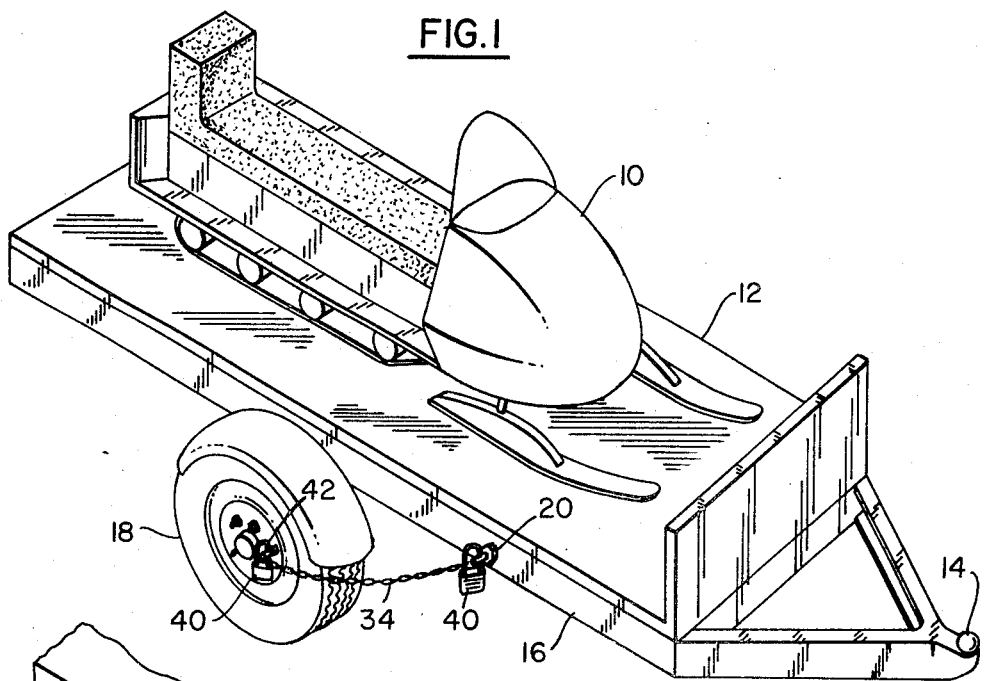
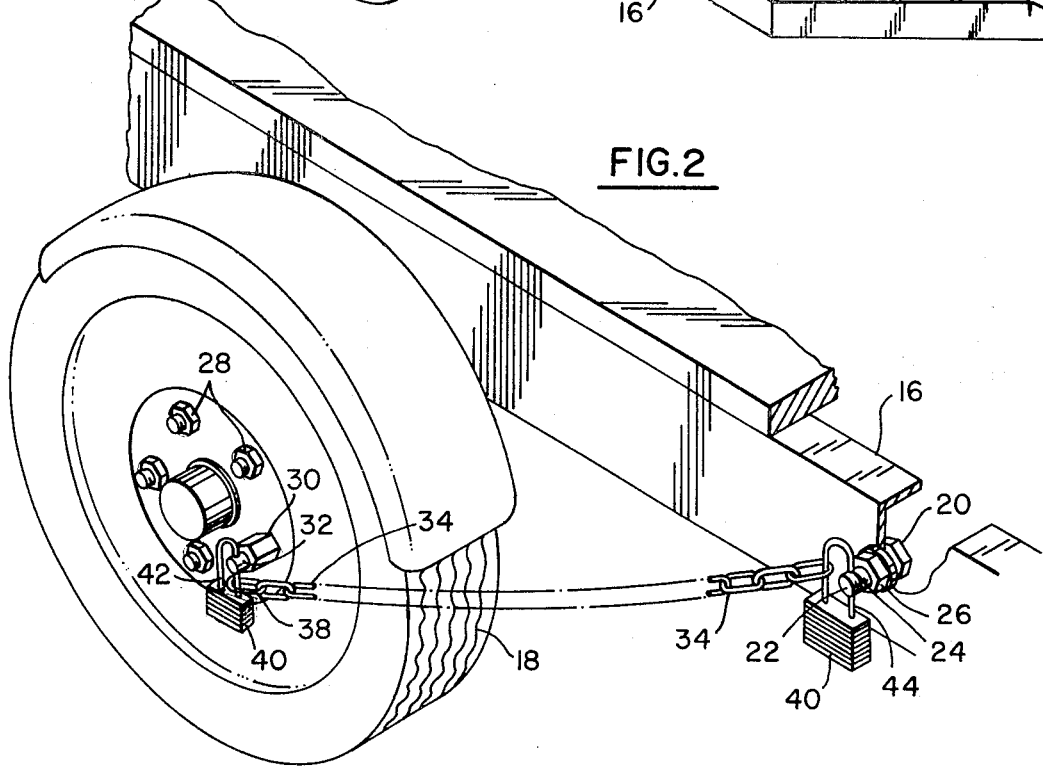
INVENTORS
BRUCE W. PENNER
KENNETH W. SPLATT
BY　*Russel C. Wells*
ATTORNEY

VEHICLE SECURITY SYSTEM

BACKGROUND OF INVENTION

1. Field of Invention

The invention relates to security systems in general and to trailer locking mechanisms in particular.

2. Prior Art

The development of the liesure time industry has provided many forms of recreation which involves a special kind of vehicle. Typically such a vehicle is the snowmobile for use in the winter months and the various class of boats for use in the summer months. Many of these vehicles are transported from one place which is typically their storage space to their place of use by means of a wheeled trailer towed by a car. When the trailer carrying the vehicle is stored, it is an easy proposition for an unauthorized person to hitch the trailer to a car and to tow the trailer and its contents away.

At the present time there are only the typical, old standby methods of preventing a trailer from being towed by unauthorized people. These methods include removing the tires, or chaining the trailer to a huge tree or post set in the ground; these methods are impractical and at best inconvenient to the rightful owner of the trailer.

Several prior art patents have dealt with the problem of locking an externally carried spare tire to the frame of a car by means of a chain and lock. Additionally in order to prevent either the spare tire from being removed or the car itself from being moved, one patent teaches the use of a chain to wrap around both the spare tire and each of the rear wheels and then securely locked. Another locked the front wheel to the bumper of the car by a specially styled clamp to fit a particular type of bumper.

It is an object of this invention to easily prevent a trailer from being towed by an unauthorized person.

It is a further object of this invention to provide a locking or security system which is easily and securely added to an existing trailer and when not performing the function of securing the trailer may be used to secure the olad on the trailer.

SUMMARY OF INVENTION

A vehicle locking mechanism having a bolt member extending through the frame of a vehicle. The bolt member has an aperture through one end of the bolt between the end of the bolt and a nut securing the bolt to the frame. Threadably secured to one lug on the wheel of the trailer is a tubular member also having an aperture in one end. The tubular member additionally functions as a lug nut for securing the wheel to the axle of the trailer. A flexible member such as a chain of a predetermined length extends from the bolt member to the tubular threaded member. One end of the chain is secured in the aperture of the bolt member in such a manner that it cannot be removed except by authorized personnel. The other end of the chain is lockably and detachably secured to the aperture of the tubular threaded member by means of lock passing through the end of the chain and the aperture of the tubular member. The predetermined length of the chain functions to prevent the wheel from rotating about the axle and the locking means permits authorized removal of the chain when the trailer is to be moved.

DESCRIPTION OF THE DRAWING

In the drawing:

FIG. 1 is a perspective view of a snowmobile trailer having the security system operatively attached thereto; and FIG. 2 is an enlarged perspective view illustrating the security system of FIG. 1.

DETAILED DESCRIPTION

Referring to the FIGS. by the characters of reference, there is illustrated in FIG. 1 a perspective view of a snowmobile 10 on a trailer 12. Without the vehicle security system to be described herein, in order to move the trailer 12, a tow vehicle such as a car need only be backed up to the trailer and the hitch 14 of the trailer secured to the tow vehicle. All that is required is that the ball on the towing vehicle's hitch be of the proper diameter to fit the trailer hitch. Thus, both authorized and unauthorized towing of the trailer is possible.

To prevent the unauthorized towing of the trailer 12, the security system as illustrated in FIG. 2 is used. With such a system, unless one has a key, the trailer cannot be moved. Through a frame member 16 adjacent to one of the trailer wheels 18, an aperture is provided. Into this aperture, a bolt member 20 such as illustrated in FIG. 2 is inserted. The leg portion 22 of the bolt is extended beyond the normal threaded length to provide space on the bolt for an aperture 24 normal to the axis of the bolt 20. The reason for the extra length of the bolt is to provide adequate threaded holding power when the bolt 20 is placed through the frame 16 and a nut 26 is secured against the frame 16.

In a similar manner, one of the lugs 28 on the wheel 18 of the trailer has a special tubular threaded member 30 functioning as a wheel nut to hold the wheel on the axle. This member 30 must be longer than the length of the lug extending through the wheel. In the preferred embodiment, this member has an external surface in the shape of a hexagon to fit a standard wrench. At the end of the threaded portion of the member 30, there is an aperture 32 which is normal to the axis of the threads. It is required that this aperture be placed beyond the threaded portion so as to clear the end of the lug 28 on the trailer wheel 18. Other than for providing a surface to accept a wrench, the external shape of the threaded member is relatively unimportant.

In addition to the two special threaded members, the security system comprises a flexible member 34. In the preferred embodiment a chain is used, however any elongated member having sufficient length and shape may be used providing that there is an aperture 36–28 at each end of similar size to the apertures 24 and 32 of the two threaded members. With the use of a flexible member such as a chain, a precise relationship between the aforementioned two threaded members need not be maintained as, if necessary, several links in the chain may be dropped to reach the desired length.

In the preferred embodiment, the flexible member is detachably secured to each of the threaded members 20 and 30 by means of a long shackly lock 40. One leg 42 of the shackle may extend through the aperture 32 of the threaded member 30 and through the end link of the chain 34 or in the alternative each leg of the shackle may extend through the aperture and the link respectively. With the locks in position as illustrated in FIG. 2, niether the special bolt 20 nor the threaded member 30 may be removed. The nut securing the bolt 20 to the frame 16 cannot be removed because of the shackle 44 and the threaded member 30 on the wheel lug 28 cannot be rotated through enough degrees to be removed from the wheel lug 28.

In order to outfit a trailer 12 with the security system as described herein, an aperture must be made in the frame 16 of the trailer at a location adjacent to one of the trailer wheels. Through this aperture is inserted and secured the bolt member 20 having the aperture at the threaded end. It is necessary that the aperture in the bolt member be on the same side of the frame as is the nut 26 securing the bolt 20 to the frame.

Next the wheel nut on the lug 28 nearest the bolt member 20 is removed. A threaded member 30 having a ring end is placed on the lug 28 and securely tightened to the degree of tightness necessary to hold the wheel 18 on the axle. The ring end may be an aperture 32 in the end of an elongated tubular member or may be a ring welded or in some manner secured to the threaded member.

The flexible member 34, such as a chain, is then securely locked at one end to the bolt 20 in the frame. The chain is then stretched and the link closest to the special nut 30 on the wheel 18 is also locked to the ring end of the nut. The length of the chain 34 must be such as to prevent the wheel from rotating, hence the lug 28 nearest the bolt 20 on the frame is used. If the chain is too long, the wheel might still rotate and the security is lost.

There has thus been described a vehicle security system and mechanism for preventing the unauthorized towing of a trailer. In particular the trailer in the preferred embodiment is used to transport a recreational vehicle although any wheeled trailer may be secured by this teaching.

What is claimed is:

1. A vehicle security system for preventing a vehicle from being moved, said system comprising:
    a frame member on the vehicle, said frame member adjacent one of the wheels of the vehicle,
    securing means extending through said frame member, one end of said securing means having an aperture therethrough,
    threaded means on one of the wheel lugs of the vehicle and extending away from the lug, said threaded means having an aperture in said end extending away from said lug,
    a chain member having a predetermined length extended from said securing means to said threaded means, and
    locking means for securing said chain member to said securing means and said threaded means, thereby preventing the wheel from rotating.

2. A vehicle locking mechanism comprising:
    bolt means extending through the frame of the vehicle at a position approximate one of the wheels of the vehicle, said bolt means having one end thereof extending away from the frame in the direction of the wheel,
    threaded means secured on one of the circumferentially spaced wheel lugs of the wheel nearest said bolt means, said threaded means having one end extending away from the wheel,
    chain means extending from said bolt means to said threaded means, said chain means having a predetermined length, and
    locking means for releasably securing said chain means to said bolt means and said threaded means thereby preventing said threaded means from normal moving along the sinusoiddal path as the wheel rotates about its axis.

3. A vehicle locking device comprising:
    a bolt member for extending through the frame of a vehicle, said bolt member having an aperture through one end thereof,
    a tubular threaded member for threading on one lug of the wheel axle of the vehicle to retain the wheel thereon, said member having an aperture through the end extending away from the lug,
    a flexible connecting member for extending from said bolt member to said tubular threaded member,
    securing means for securing said flexible connecting member to said bolt member, and
    locking means for locking said flexible connecting member to said tubular member for preventing the wheel from rotating about its axle and for authorized removal of said flexible connecting member from said threaded member when said vehicle is to be moved.

* * * * *